United States Patent
Yamaguchi

[11] 3,794,170
[45] Feb. 26, 1974

[54] FILTER
[75] Inventor: Terumoto Yamaguchi, Anjo, Japan
[73] Assignee: Nippondenso Co., Ltd., Aichi-ken, Japan
[22] Filed: Aug. 17, 1971
[21] Appl. No.: 172,433

[30] Foreign Application Priority Data
Aug. 29, 1970 Japan.................................. 45-75664

[52] U.S. Cl............ 210/136, 210/DIG. 17, 210/440
[51] Int. Cl............................................. B01d 27/08
[58] Field of Search .... 210/710, DIG. 17, 440, 443, 210/450, 136

[56] References Cited
UNITED STATES PATENTS
3,342,339  9/1967  Riolo ........................... 210/DIG. 17
3,608,724  9/1971  Baldwin ............................. 210/440
3,529,721  9/1970  Papp ............................. 210/443 X
3,231,089  1/1966  Thornton .................... 210/DIG. 17

Primary Examiner—Samih N. Zaharna
Assistant Examiner—T. A. Granger
Attorney, Agent, or Firm—Cushman, Darby & Cushman

[57] ABSTRACT

A filter wherein a closure member of the filter consists of a single sheet of plate and secured directly to a cylindrical body of the filter, with its peripheral edge tightened to the open edge of said cylindrical body in overlapping relation.

1 Claim, 9 Drawing Figures

INVENTOR

Terumoto YAMAGUCHI

BY
ATTORNEYS

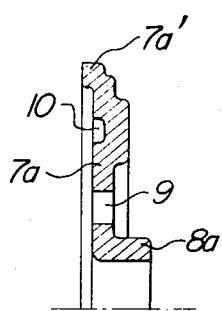
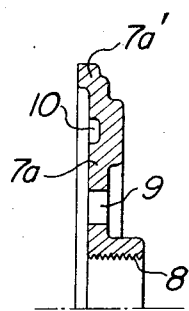
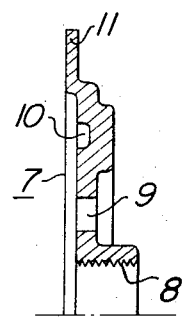
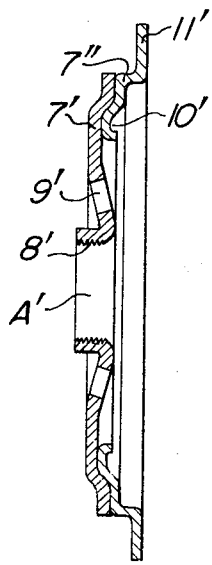
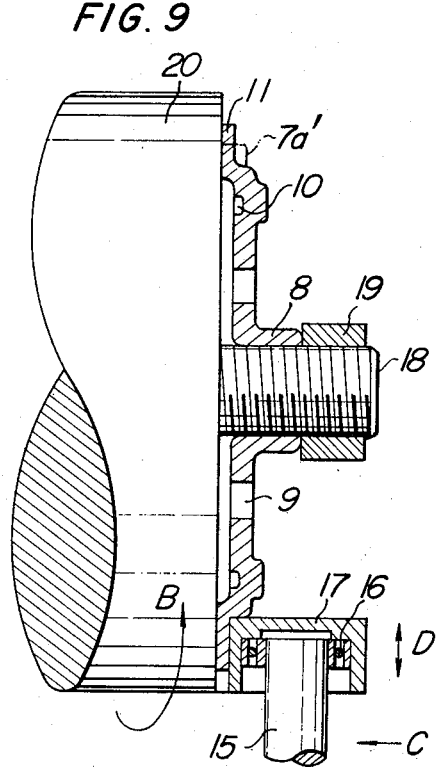

FILTER

BACKGROUND OF THE INVENTION

1. Field of the Invention

This invention relates to improvements in the lubricating oil filter mounted on internal combustion engines, and more particularly to improvements in the closure member thereof.

The most of automotive vehicles presently in use are equipped with an oil filter to remove from lubricating oil such foreign materials as metal dusts, carbon particles and sludge present therein and thereby to ensure satisfactory operations of the engine and other associated mechanisms.

2. Description of the Prior Art

Conventional oil filters usually comprise a cylindrical body, a filter element disposed in said cylindrical body and a closure member for closing an open end of said cylindrical body, said closure member consisting of a relatively thick plate and a relatively thin plate secured thereto by spot welding, and being fixed to said cylindrical body by curling the outer peripheral edge of said relatively thin plate over the open edge of said cylindrical body in tight engagement therewith. The relatively thick plate of the closure member is formed with a discharge opening at the center and a plurality of inlet holes in the peripheral edge portion thereof. Thus, the lubricating oil to be filtered is admitted into the cylindrical body through the inlet holes, passed through the filter element and discharged from the central discharge opening.

The oil filter undergoes a vibration of the engine during operation of the engine. Therefore, it has been frequently experienced with the conventional oil filters that the relatively thick plate of the closure member is set free from the relatively thin plate due to severance of the spot welds and moves in the cylindrical body. Furthermore, in the conventional oil filters, since the relatively thick plate and relatively thin plate are provided separately and connected with each other by spot welding, the production of the closure member requires a large number of manhours, rendering said closure member expensive. Still further, when the filter is subjected to a plating treatment, the plating solution intrudes into the gap between the thick and thin plates, which cannot be removed completely in the washing operation which follows, and the plating solution thus retained in the gap tends to cause a corrosion of the plates.

SUMMARY OF THE INVENTION

The object of the present invention is to provide a filter which is simple in construction, low in cost and percentage of rejection and highly useful, by forming a tightening rim along the periphery of a disc plate of large thickness which constitutes a closure member of the filter and tightly fixing said disc plate directly to a main body of the filter at said rim.

According to the present invention there is provided a filter comprising a cylindrical body open at one end thereof, a filter element disposed in said cylindrical body and a closure member, said closure member having a lubricating oil discharge opening formed at the center and a plurality of lubricating oil inlet holes formed in the peripheral edge portion thereof, whereby the lubricating oil to be filtered is admitted into the cylindrical body through a check valve, passed through the filter element and discharged from the discharge opening, characterized in that the peripheral edge of said closure member is curled and tightly fitted over the open edge of said cylindrical body in overlapping relation.

BRIEF DESCRIPTION OF THE DRAWING

FIG. 2 is a transverse sectional view of a closure member of a conventional filter; and FIGS. 3 – 9 are a set of views illustrating the production procedure of the closure member according to the present invention.

DESCRIPTION OF THE PREFERRED EMBODIMENT

Figure 1:
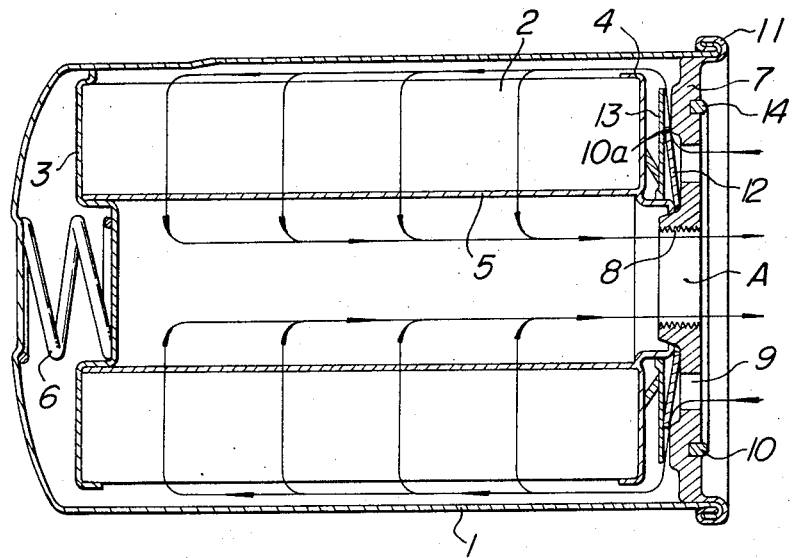
FIG. 1 is a sectional view of the filter according to the present invention.

The present invention will be described hereinafter by way of example with reference to the drawing.

Referring to FIG. 1 a filter according to the invention includes a main body or container 1 which is cylindrical in shape and has a bottom wall closing one end thereof. In the container 1 is disposed a cylindrical filter element 2 interposed between opposite end plates 3, 4 and having a reinforcing cylinder 5, consisting of a metal screen, axially disposed therein. A compression spring 6 is provided between the end plate 3 and the bottom wall of the container 1. A closure member 7 which constitutes the critical part of the present invention consists of a disc plate of large thickness. The disc plate 7 has a central oil discharge opening A defined by an internally threaded neck 8 at which the filter is mounted on an internal combustion engine, and a plurality of oil inlet holes 9 radially arranged around said central oil discharge opening A and a gasket receiving annular recess 10 exteriorly of said oil inlet holes 9, between said central oil discharge opening and the outer peripheral edge thereof. The outer peripheral edge of the disc plate 7 is provided with a tightening rim 11. The closure member, i.e., the disc plate 7, is secured to the open end of the container 1, with its rim 11 seamed over the outer surface of the open end of said container in tight engagement therewith. Reference numeral 12 designates a back flow preventing plate, 13 a back flow preventing plate pressing plate and 14 a gasket to prevent an oil leakage from the gap between the filter and the internal combustion engine after said filter is mounted on said engine.

A closure member of a conventional filter, as is clearly shown in FIG. 2, consists of a relatively thick disc plate 7' and a relatively thin annular plate 7'' connected to the peripheral edge portion of said relatively thick disc plate 7' by spot welding. Similar to the disc plate 7 of the invention, the disc plate 7' has an internally threaded mounting neck 8' at the center, which defines an oil discharge opening A', and oil inlet holes 9' in the peripheral edge portion thereof. The annular plate 7'' has a gasket receiving annular recess 10' and a tightening rim 11' at the peripheral edge thereof. This prior art closure member is secured to the container 1 by tightening the tightening rim 11' of the annular plate 7'' around the outer surface of the open end of said container in overlapping relation.

With the filter of the instant invention constructed as described above, the contaminated lubricating oil from the internal engine flows from the oil inlet holes 9 in the disc plate 7 into the container 1 as indicated by the arrows in FIG. 1 while forcibly opening the back flow preventing plate 12 against the biasing force of the pressing plate 13, passes between the inner peripheral wall of the container 1 and the outer peripheral surface of the filter element 2 and then passes through said filter element and is cleaned thereby. The cleaned lubricating oil returns to the internal combustion engine from the oil discharge opening A.

Figure 3:
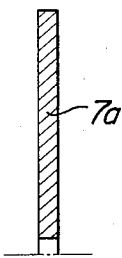
Figure 4:
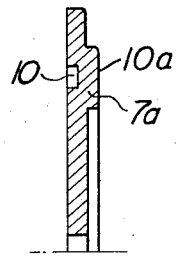
Figure 5:
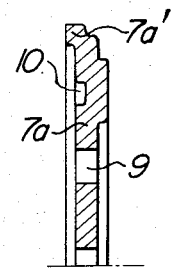

The closure member 7 of the invention can be produced very economically by the following procedure:

Namely, first of all, the gasket receiving annular recess 10 is formed by pressing (see FIG. 4) in a disc plate 7a of relatively large thickness which has a small central opening as shown in FIG. 3. This step also provides an annular protuberance 10a on the opposite, inner side of the disk plate 7a, which acts as a seat for the back flow preventing plate 12 of the check valve 12, 13 (FIG. 1). Then, the oil inlet holes 9 are formed in the disc plate 7a and concurrently a stepped flange 7a' is formed along the peripheral edge of said disc plate by pressing as shown in FIG. 5. Thereafter, a cylindrical neck 8a is formed at the center of the disc plate by stamping as shown in FIG. 6 and the internal threads are cut in the inner peripheral surface of said cylindrical neck 8a to form the internally threaded neck 8 as shown in FIG. 7. Fianlly, the stepped flange 7a' is stretched as shown in FIG. 8 to form the tightening rim 11, whereby the closure member 7 is produced. The tightening rim 11 of the closure member 7 is formed preferably in the manner shown in FIG. 9. Namely, in FIG. 9 a pressing roller 17 is mounted on a roller shaft 15 through ball bearing 16, while the disc plate blank of the shape shown in FIG. 4 is fixed to a rotary mount 20 by means of a tightening bolt 18 and nut 19, and said roller shaft 15 is moved toward the rotary mount 20 in the direction of the arrow C, to press the stepped flange 7a' of the disc plate blank, while rotating said rotary mount 20 in the direction of the arrow B. By moving the roller shaft 15 reciprocally vertically as indicated by the arrow D, the tightening rim 11 can be easily formed. It should be understood that the above-described procedure of producing the closure member is only illustrative and many other procedures can be employed.

As described above, the closure member of the invention consists of a single plate of relatively large thickness having a tightening rim formed along the peripheral edge thereof. Therefore, there can be obtained such remarkable advantages that the material cost and production cost can be substantially reduced, that the strength of the closure member can be increased due to the absence of spot welds, and that the unsatisfactory result of plating can be completely eliminated which has heretofore been had in the production of the conventional closure member. Consequently, the filter according to the invention is simple in construction, low in cost and can be produced with a very low percentage of rejection.

I claim:

1. A filter comprising a cylindrical body open at one end, means defining a peripheral edge at said end, a filter element disposed in said cylindrical body, and a closure member, said closure member having means defining a lubricating oil discharge opening centrally therethrough and means defining a plurality of oil inlet openings therethrough intermediate the edge thereof, annular check valve means disposed interiorly adjacent said closure member for blocking flow out of the cylindrical body through said plurality of openings whereby the lubricating oil to be filtered is admitted from said oil inlet openings into said cylindrical body through said check valve, passed through said filter element and discharged from said discharge opening, said closure member including a tubular, axially inwardly projecting internally threaded neck surrounding said discharge opening, said closure member including an integral plate element being relatively thick as it radiates from said neck, until reaching an extent corresponding to the internal diameter of the cylindrical body adjacent said peripheral edge thereof, whereupon said integral plate element undergoes a substantial reduction in thickness to provide a thin peripheral tightening rim for said edge, the difference in thickness of the integral plate element where it undergoes said substantial reduction in thickness providing a radially outwardly facing shoulder for abutment with the cylindrical body; said thin peripheral tightening rim curled and tightly fitted over the peripheral edge of the open end of said cylindrical body in overlapping relation therewith, means defining an annular groove exteriorly in said closure member, the depth of said groove being within the thickness of said plate and said groove being configured for receiving an annular gasket, said closure member also comprising on the inner surface thereof an annular protrusion defining a seat for engaging the outer peripheral portion of said check valve, the inner peripheral edge of said check valve being fixed onto the root portion of said internally threaded neck.

* * * * *